United States Patent
Mao et al.

(10) Patent No.: US 12,102,861 B2
(45) Date of Patent: *Oct. 1, 2024

(54) EXTINGUISHING MATERIAL AND PREPARATION METHOD THEREOF

(71) Applicant: ZHEJIANG MINGNUO NEW MATERIAL TECHNOLOGY CO., LTD, Huzhou (CN)

(72) Inventors: Han Mao, Huzhou (CN); Hong Chen, Huzhou (CN); Jingyuan Wu, Huzhou (CN)

(73) Assignee: ZHEJIANG MINGNUO NEW MATERIAL TECHNOLOGY CO., LTD, Huzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,312

(22) Filed: Aug. 22, 2023

(65) Prior Publication Data

US 2023/0405381 A1 Dec. 21, 2023

Related U.S. Application Data

(63) Continuation of application No. PCT/CN2023/095702, filed on May 23, 2023.

(30) Foreign Application Priority Data

Jun. 15, 2022 (CN) .......................... 202210673236.6

(51) Int. Cl.
*A62D 1/00* (2006.01)
(52) U.S. Cl.
CPC .................. *A62D 1/0021* (2013.01)
(58) Field of Classification Search
CPC ...... A62D 1/00; A62D 1/0007; A62D 1/0021; A62D 1/0092; A62D 1/06
(Continued)

(56) References Cited

U.S. PATENT DOCUMENTS

| 4,230,808 | A | * | 10/1980 | Pietersen | ............. | A62D 1/0021 |
| | | | | | | 428/305.5 |
| 4,588,639 | A | * | 5/1986 | Ozono | .................... | B01J 13/04 |
| | | | | | | 428/402.22 |

(Continued)

FOREIGN PATENT DOCUMENTS

| CN | 113230577 | A | * | 8/2021 | ........... A62D 1/0021 |
| CN | 113476778 | A | * | 10/2021 | |

(Continued)

*Primary Examiner* — Matthew R Diaz
(74) *Attorney, Agent, or Firm* — True Shepherd LLC; Andrew C. Cheng

(57) ABSTRACT

A perfluorohexanone microcapsule with a high core-wall ratio is provided. In the perfluorohexanone microcapsule, there is no need for auxiliary materials/fillers and other adsorption or high-boiling solvent to dissolve perfluorohexanone. By coating the microcapsule shell with secondary polymers, the shell strength of the microcapsule is improved, the volatilization loss of perfluorohexanone is reduced, and the problem of short storage life of the perfluorohexanone microcapsule material is overcome, so that it has commercial application value. The perfluorohexanone microcapsule can be further compounded with various materials and interfaces to obtain various fire extinguishing materials with perfluorohexanone microcapsule as the core component. This kind of fire extinguishing material can be dry powder of perfluorohexanone microcapsules, and can also be made into shapes suitable for various surfaces, such as fire extinguishing stickers, fire extinguishing blankets and fire-fighting clothes with various thicknesses.

11 Claims, 10 Drawing Sheets

(58) Field of Classification Search
USPC .......................................................... 252/2, 8
See application file for complete search history.

(56) References Cited

U.S. PATENT DOCUMENTS

| | | | |
|---|---|---|---|
| 6,419,027 | B1 | 7/2002 | Tapscott |
| 10,335,625 | B2 | 7/2019 | Liu et al. |
| 11,617,909 | B2 | 4/2023 | Cao et al. |
| 2017/0292011 | A1* | 10/2017 | Watanabe ................ B01J 13/04 |
| 2022/0152439 | A1* | 5/2022 | Lee .......................... B01J 13/18 |

FOREIGN PATENT DOCUMENTS

| | | | | |
|---|---|---|---|---|
| RU | 2702566 C1 | * | 10/2019 | |
| WO | WO-2008009216 A1 | * | 1/2008 | .............. B01J 13/14 |
| WO | WO-2009090747 A1 | * | 7/2009 | ........... A62D 1/0021 |
| WO | WO-2012177181 A1 | * | 12/2012 | ........... A62D 1/0021 |
| WO | WO-2016089240 A1 | * | 6/2016 | ........... A62D 1/0021 |

* cited by examiner

EXTINGUISHING MATERIAL AND PREPARATION METHOD THEREOF

CROSS-REFERENCE TO RELATED APPLICATIONS

This application is a continuation of International Patent Application No. PCT/CN2023/095702 with a filing date of May 23, 2023, designating the United States, now pending, and further claims priority to Chinese Patent Application No. 202210673236.6 with a filing date of Jun. 15, 2022. The content of the aforementioned applications, including any intervening amendments thereto, are incorporated herein by reference.

TECHNICAL FIELD

The present application belongs to the technical field of fire extinguishing agent application, in particular to a perfluorohexanone microcapsule fire extinguishing material and a preparation method thereof.

BACKGROUND

Perfluorohexanone (CAS No. 756-13-8) is a new environmental protection fire extinguishing agent. It is a liquid at room temperature, its heat of vaporization is only ⅕ of that of water, and its vapor pressure is 25 times that of water. These properties make it easy to vaporize and quickly absorb heat to achieve the effect of fire extinguishing. Its ozone depletion potential (ODP): 0, global greenhouse effect potential (GWP): 1, and atmospheric survival life (year): 0.014(5 days), which can be a long-term and lasting substitute for halon fire extinguishing agents. However, because its boiling point is only 49° C., its use as a fire extinguishing agent is still limited. At present, it is usually used as a substitute for halon fire extinguishers, or as a total flooding system and local application system for class B fire protection. In practical application, it usually needs to be stored in a fire extinguishing tank or a special fire extinguishing system, so it is inconvenient to extinguish the fire.

In order to be better applied to various fire prevention and extinguishing scenes, the fire extinguishing agent can be used as the core material to prepare microcapsules. In the prior art, for example, China present application patent with the authorization number of CN103370104B discloses a microcapsule fire extinguishing agent with halogenated hydrocarbon as the core material. However, compared with halogenated hydrocarbons, perfluorohexanone has a low boiling point and obviously volatilizes from 30° C., so the preparation and service life of microcapsules with perfluorohexanone as the core material are greatly hindered. In the prior art, there is a Russian patent with the application number of RU2011125756, which discloses a microcapsule fire extinguishing agent, a preparation method thereof, a fire extinguishing composite material and a fire extinguishing coating, which can be exploded within the range of 90-270° C. to realize the release of the content fire extinguishing agent material and achieve the purpose of fire extinguishing. In the prior art, for example, in China present application patent with publication number of CN109420281A, auxiliary materials such as polymer resin, fiber and inorganic filler are added to adsorb or dissolve perfluorohexanone, so as to reduce the volatility of perfluorohexanone. However, these auxiliary materials usually have no or little fire extinguishing performance, and reduce the proportion of fire extinguishing agent core materials in microcapsules, so the fire extinguishing effect will be limited.

SUMMARY

The primary technical problem to be solved by the present application is to provide a perfluorohexanone fire extinguishing material with wider application scenarios without special storage and trigger equipment. This material takes perfluorohexanone microcapsules as the core component, and its final exhibition forms include fire extinguishing microcapsule powder, fire extinguishing microcapsule slurry, fire extinguishing patch, fire-retardant cloth, fire-retardant coating and the like. Among them, the diameter of perfluorohexanone microcapsules can be controlled in the range of 20-400 μm, and the core-wall ratio of microcapsules can be controlled in the optimal range of 5:1-9:1. The mass fraction of fire extinguishing microcapsules in fire extinguishing materials is usually 30%-100% (100% is pure microcapsule powder), and the mass fraction of perfluorohexanone in the whole fire extinguishing materials is 25%-80%. The fire extinguishing material can be kept stable in various conventional environments (no obvious high-temperature heat source or open flame). The fire extinguishing trigger temperature is adjusted by the kind and thickness of microcapsule wall material and the kind of bonding polymer. The polymer material used in the present application usually has a softening point of 80-130° C., an air permeability of <700 ml/(cm$^2$·h), a shrinkage rate of less than 5% after curing, a water absorption rate of less than 5%, a tensile strength of greater than 10 MPa and less than 80 MPa. The microcapsule can soften, rupture and release perfluorohexanone at 80-130° C. or in case of open flame, and automatically trigger the fire extinguishing function.

Other objects of the present application will become apparent from the following description, which is given by way of example only.

The technical solution adopted by the present application to solve the above key technical problems is as follows: preparing fire extinguishing microcapsules with perfluorohexanone as the core material (hereinafter referred to as perfluorohexanone microcapsules), coating the microcapsules with a secondary polymer, and compounding with various materials and interfaces to obtain various fire extinguishing materials with perfluorohexanone microcapsules as the core component, such as fire extinguishing microcapsule powder, fire extinguishing microcapsule slurry, fire extinguishing patch, fire-retardant cloth, fire-retardant coating and the like.

In a first aspect, the present application provides a perfluorohexanone microcapsule with a fire extinguishing trigger temperature of 80-130° C., comprising:
  a capsule core containing perfluorohexanone,
  a capsule shell, from inside to outside, at least comprising a first-layer shell and a second-layer shell, wherein the first-layer shell and the second-layer shell respectively comprise a polymer material, wherein:
  the mass ratio of dry weights of the perfluorohexanone to the capsule shell in the perfluorohexanone microcapsule can be 1:1-10:1 (preferably 3:1-9:1 and more preferably 5:1-9:1);
  the perfluorohexanone microcapsule preferably has a size with a diameter in the range of 20-400 μm (for example, 20-100 μm, 50-200 μm, 100-150 μm, 150-300 μm, 250-400 μm). The size distribution of microcapsules can be narrow, wide, or multi-modal. Compared with the existing patent of microcapsule fire extinguishing agent, the present application adopts novel and environment-friendly perfluorohexanone as the fire extinguishing agent, and has the advantages of high core-wall ratio (the ratio of the perfluorohexanone to the wall material can reach 9:1) and wide source of wall materials, which overcomes the property that perfluorohexanone is volatile and difficult to store. The prepared fire extinguishing microcapsule can keep the fire extinguishing performance without obvious attenuation in a wide temperature and humidity range, and has a long storage and service life. The fire extinguishing material with perfluorohexanone microcapsule as the core component can be prepared into dry powder or forms suitable for various surfaces, such as fire extinguishing stickers, fire extinguishing blankets, firefighting clothes and the like. In order to adapt to a wider range of application scenarios, semi-finished products of perfluorohexanone microcapsule slurry can also be prepared. The slurry has coatability, can be self-constructed, and is suitable for various micro-to macro-scale fire prevention/extinguishing environments. In addition, microcapsules can also be added to water-based coatings to prepare fire-retardant coatings.

In some embodiments, the polymer materials contained in the first-layer shell and the second-layer shell are independently selected from one or more of natural polymers, semi-synthetic polymers and synthetic polymers. Preferably, the softening point of the polymer material is 30-100° C. before curing and 80-150° C. after curing; the air permeability is less than 700 ml/(cm$^2$·h), the shrinkage after curing is less than 5%, the water absorption is less than 5%, and the tensile strength is less than greater than 10 MPa and less than 80 MPa.

In some embodiments, the natural polymer is selected from one or more of gelatin, alginate, gum Arabic, chitosan, polyglutamic acid and ⊖-cyclodextrin.

In some embodiments, the semi-synthetic polymer is selected from one or more of sodium carboxymethyl cellulose, hydroxypropyl methylcellulose and starch octenyl succinate.

In some embodiments, the synthetic polymer is selected from one or more of polymethacrylate, epoxy resin, polyurethane, amino resin, phenolic resin, acrylic resin, furan resin, resorcinol-formaldehyde resin, xylene-formaldehyde resin, unsaturated polyester, polyimide and urea-formaldehyde resin.

In some embodiments, the capsule shell further comprises an anti-ultraviolet agent.

In some embodiments, the capsule shell further comprises a nano oxide.

In some embodiments, the nano oxide comprises nano silicon dioxide or nano metal oxide.

In some embodiments, the nano oxide comprises nano silicon dioxide and nano metal oxide.

In some embodiments, the first-layer shell contains one or more polymer materials selected from gelatin, alginate, Arabic gum, chitosan, polyglutamic acid, sodium carboxymethyl cellulose, hydroxypropyl methylcellulose, ⊖-cyclodextrin, and starch octenylsuccinate.

In some embodiments, the second-layer shell contains one or more polymer materials selected from polymethacrylate, epoxy resin, polyurethane, amino resin, phenolic resin, acrylic resin, furan resin, resorcinol-formaldehyde resin, xylene-formaldehyde resin, unsaturated polyester, polyimide and urea-formaldehyde resin.

In a second aspect, the present application provides a perfluorohexanone microcapsule powder obtained by drying the perfluorohexanone microcapsule.

In a third aspect, the present application provides a perfluorohexanone microcapsule slurry obtained by mixing the perfluorohexanone microcapsule with a polymer solution and dispersing uniformly.

In a fourth aspect, the present application provides a preparation method of a perfluorohexanone microcapsule, which comprises the following steps: forming a first-layer shell encapsulating perfluorohexanone to obtain the perfluorohexanone microcapsule with a single shell; coating a second-layer shell on the first-layer shell to obtain the perfluorohexanone microcapsule.

In a fifth aspect, the present application provides a perfluorohexanone microcapsule directly prepared by the preparation method.

In a sixth aspect, the present application provides a perfluorohexanone microcapsule powder obtained by drying the perfluorohexanone microcapsule at a low temperature.

In a seventh aspect, the present application provides use of the perfluorohexanone microcapsule, comprising:
    use in preparing fire prevention and/or fire extinguishing products; or
    use in preparing fire prevention and/or fire extinguishing related products; or
    use in fire prevention.

In an eighth aspect, the present application provides a fire prevention and/or extinguishing material comprising:
    the perfluorohexanone microcapsule or microcapsule powder; and
    at least one substrate.

In some embodiments, the substrate comprises a polymer, a water-based coating, a coating or a molded article.

In some embodiments, the matrix is selected from one or more of metal, wood, fabric and polymer materials.

In some embodiments, the matrix is coated with a matrix material containing the perfluorohexanone microcapsule.

In some embodiments, the matrix is an article of manufacture containing perfluorohexanone microcapsule.

In some embodiments, the perfluorohexanone microcapsules described above are disposed in a coating.

In some embodiments, the coating comprises a polymer coating or a water-based coating.

In some embodiments, the above-mentioned manufactured product comprises, but not limited to, floor surfaces, textiles, fabrics, floor coverings, pillows, stretcher mats, seat covers, adhesive tapes, clothing, wiping cloths, furniture, conveying devices, delivery trucks, delivery light vehicles, tools, packages, containers, machine casings, machine covers, electronic components, electronic component carriers, wafer boards, wafer cans, batteries, antennas, transistors, printer assemblies, fuel pumps, fuel pump handles, hoses, hose covers, fuel pump handles, fuel pump nozzles, fuel pipe fittings, automobile seat decoration, exterior panels, interior panels, vehicle console assemblies, gaskets, seal, O-rings, diaphragm, gears, valve, bushings, shock absorbers, grommets, stoppers, bellows, plugs, shock absorbers, steering gears, weatherstrips, rollers, pipe connectors, computer cases, circuit boards, through-hole plating layer of circuit boards, microprocessors, random access memory components, read-only memory components, disk drives, electrodes or photoresists.

In a ninth aspect, the present application provides a fire extinguishing sheet comprising:
    the perfluorohexanone microcapsule powder and the matrix material.

In some embodiments, the surface of the fire extinguishing layer of the fire extinguishing sheet is also coated with a protective film. The stability of fire extinguishing materials can be further improved by coating the surface with protective film. The protective film can be formed by coating polymer on the surface of the fire extinguishing layer. A specific polymer film is sprayed on the surface of the fire extinguishing layer to form a protective film coated on the surface of the fire extinguishing microcapsule layer, which can block air, moisture, prevent aging, prevent acid and alkali fog, resist ultraviolet rays, maintain proper humidity, and at the same time have a self-repairing function under certain conditions. The macromolecule polymer is selected from one or more of polyester, polyurethane, phenolic resin, urea-formaldehyde resin, polyurea resin, macromolecule silicon, natural macromolecule, acrylic resin and epoxy resin. Preferably, the thickness of the protective film is 50-200 μm.

In some embodiments, the preparation method of the fire extinguishing sheet comprises: mixing the perfluorohexanone microcapsule powder with a matrix material, uniformly dispersing, introducing into a mold, curing, drying, and spraying polymer on the surface of the fire extinguishing layer to obtain a fire extinguishing sheet. The mass fraction of the perfluorohexanone microcapsule powder in the fire extinguishing sheet is 40%-80%, the fire extinguishing time of the fire extinguishing cloth is less than or equal to 20 s, the smoldering time is 0 s, the continuous burning time is 0 s, there is no melting drop, and the weight loss rate is less than or equal to 5% in an air drying oven at 60° C. for 8 h.

In a tenth aspect, the present application provides a fire protection and extinguishing cloth, which comprises:

perfluorohexanone microcapsule powder, a matrix material and a matrix cloth, wherein the perfluorohexanone microcapsule powder is arranged in a coating on the surface of the matrix cloth.

In some embodiments, the matrix cloth is a flame retardant cloth. Exemplary fire retardant fabrics include, but are not limited to, glass fiber fabrics, basalt fiber fire retardant fabrics, acrylic cotton fiber fire retardant fabrics, Nomex fire retardant fabrics, SM fire retardant fabrics, blue glass fiber fire retardant fabrics or aluminum foil fire retardant fabrics.

In some embodiments, the surface of the coating is also coated with a protective film. Coating the surface of the coating with the protective film can further improve the stability of fire-fighting materials. The protective film can be formed by coating a macromolecule polymer on the surface of the coating. A specific polymer film is sprayed on the surface of the fire extinguishing layer to form a protective film coated on the surface of the fire extinguishing microcapsule layer, which can block air, moisture, prevent aging, prevent acid and alkali fog, resist ultraviolet rays, maintain proper humidity, and at the same time have a self-repairing function under certain conditions. The macromolecule polymer is selected from one or more of polyester, polyurethane, phenolic resin, urea-formaldehyde resin, polyurea resin, macromolecule silicon, natural macromolecule, acrylic resin and epoxy resin. Preferably, the thickness of the protective film is 50-200 μm. Preferably, the thickness of the coating is 0.5-3 mm.

In some embodiments, the preparation method of the above-mentioned fire-proof and fire extinguishing cloth includes: mixing and uniformly dispersing perfluorohexanone microcapsule powder with a matrix material to prepare a slurry with coatability, forming a coating on the surface of the matrix by brushing and/or scraping, curing, drying, and spraying a macromolecule polymer on the surface of the coating to obtain the fire-proof and fire extinguishing cloth, wherein the matrix material is a polymer solution. The mass fraction of perfluorohexanone microcapsule powder in the fire-proof and fire extinguishing cloth is 40%-80%, the fire extinguishing time of the fire-proof and fire extinguishing cloth is less than or equal to the smoldering time is 0 s, the continuous burning time is 0 s, there is no melting drop, and the weight loss rate is less than or equal to 5% in an air-blast drying oven at for 8 h.

The perfluorohexanone microcapsules of the present application provide various advantages and benefits:

(1) Perfluorohexanone is prepared into various fire extinguishing materials in the form of microcapsules. Compared with liquid perfluorohexanone fire extinguishing agent, there is no need for special storage containers, trigger devices and manual spraying. Under the condition of a certain temperature or open flame, the microcapsule wall breaks and releases perfluorohexanone, which can realize automatic cooling and fire extinguishing.

(2) A new type of environment-friendly perfluorohexanone is used as the fire extinguishing agent, and no filler is needed to assist in adsorbing perfluorohexanone, with a high core-wall ratio (the mass ratio of perfluorohexanone to capsule shell can reach 9:1), and the capsule shell has higher strength and lower perfluorohexanone permeability, which greatly reduces the gasification loss of perfluorohexanone in the normal environment and makes it have a long service life. This fire extinguishing material is the first product developed in China at present, which will play a great role in fire prevention, cooling, fire extinguishing and fire prevention.

(3) Fire extinguishing materials from micro to macro scale, such as fire extinguishing dry powder, fire extinguishing paste, fire extinguishing coating and the like can be prepared to be suitable for various environmental requirements. Such as all kinds of batteries, electrical boxes, high-speed rail, aerospace, electrical equipment, firefighting and other scenes that need fire prevention treatment in life. Perfluorohexanone vaporizes quickly after fire extinguishing, which is non-conductive and does not pollute the protected object, and will not cause damage to finance, archives and precision facilities, and can greatly reduce the loss after fire. The fire extinguishing time of the fire extinguishing material of the present application is generally less than or equal to 20 s, the smoldering time is 0 s, the continuous burning time is 0 s, and there is no melting drop. The weight loss rate in the 60° C. air drying oven for 8 hours is less than or equal to 5%, and the material can be used repeatedly. As long as all the microcapsules in the fire extinguishing material are not consumed, it can be used for multiple fires.

DESCRIPTION OF EMBODIMENTS

Figure 1:
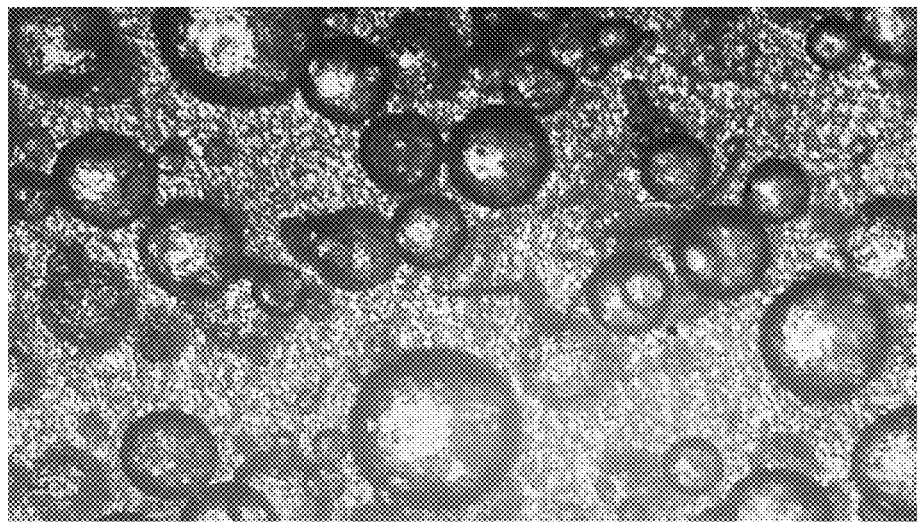
FIG. 1 is a microscopic image of perfluorohexanone microcapsules after secondary coating in Example 1 of the present application.

In this specification, with reference to external information sources (including patent specifications and other documents), this is usually for the purpose of providing a background for discussing the features of the present application. Unless otherwise stated, reference to such information sources in any jurisdiction is not to be construed as an admission that such information sources are prior art or form part of the common general knowledge in this field.

Values and dimensions disclosed herein are not to be construed as being strictly limited to the precise numerical values recited. Rather, unless otherwise specified in detail, each such value is intended to mean both the recited value and the functional equivalent range around the value. For example, the value disclosed as "50%" is intended to mean "about 50%".

The terms "capsule", "perfluorohexanone microcapsule" and "microcapsule" are used interchangeably herein.

It should be understood that the upper or lower limits of any quantity or range used herein can be independently combined.

Details of one or more examples of the present application are set forth in the following description. Other features, objects and advantages of the present application will be apparent from the description and claims.

Detailed Description of the present application:

The microcapsule comprises a core and a capsule shell encapsulating the core. The capsule core contains perfluorohexanone. Perfluorohexanone is a new type of environmental protection fire extinguishing agent. It is a liquid at room temperature, and its heat of vaporization is only 4% of that of water, while its vapor pressure is 2500% of that of water. Therefore, it is easy to vaporize and can quickly absorb heat to achieve the effect of cooling. The ozone depletion potential of perfluorohexanone is 0, the global greenhouse effect potential is 1, and the atmospheric survival life is 0.014 (5 days), so it can replace halon fire extinguishing agent for a long time. Unfortunately, its use as a fire extinguishing agent is still limited because its boiling point is only 49° C. For example, the utility model patent with the application number of CN2019213773896 discloses a suspended perfluorohexanone fire extinguishing device including a tank. When the temperature-sensitive glass column is cracked due to heating, the sealing sheet is separated from the discharge port, and the perfluorohexanone in the tank is sprayed to the fire source. Therefore, this kind of fire extinguishing device needs to fill perfluorohexanone in the tank, and its obvious disadvantages are that the tank occupies a large volume, so it is difficult to be used in precision instruments or solid materials, and it is inconvenient to move and requires manual operation to realize fire extinguishing. Another present application patent with application number CN201710786020X discloses a microcapsule automatic fire extinguishing agent, which is prepared by coating the main fire extinguishing material with a resin shell formed by the reaction of melamine and/or urea-formaldehyde with formaldehyde. However, the mass percentage of the main fire extinguishing material is 35%-60%, the core wall is relatively low, and the fire extinguishing effect is poor. Moreover, in the preparation process, the prepolymer, the main fire extinguishing material and water are emulsified to obtain monomer emulsion. When the temperature is raised to 40-80° C. and the materials to be coated react completely to obtain microcapsule suspension, the main fire extinguishing materials will evaporate and escape within this temperature range, so the final microcapsule yield should be extremely low, and its excitation temperature reaches 96° C., so its solution is of little use value. Therefore, the capsule shell of the present application has at least a first-layer shell and a second-layer shell, wherein the first-layer shell contacts and encapsulates the capsule core, and the second-layer shell wraps and contacts the first-layer shell. The capsule shell structure of the present application not only ensures the structural stability of the fire extinguishing agent microcapsule, but also overcomes the defect that the fire extinguishing material is volatile and difficult to store at normal temperature and pressure in traditional application, and the fire extinguishing agent microcapsule maintains stable properties and structure in the conventional environment without obvious high-temperature pyrogen or open flame, and its fire extinguishing performance will not be attenuated after long-term storage; furthermore, the fire extinguishing response temperature of microcapsules was reduced to 80° C., and when heated to the fire extinguishing response temperature or exposed to an open flame, the shell of perfluorohexanone microcapsules is ruptured, and perfluorohexanone is released and vaporized, which quickly absorbed heat and isolated air, so that the temperature is reduced to below the flame point temperature and automatic fire extinguishing was realized. The perfluorohexanone microcapsule provided by the present application can be used as a temperature-triggered cooling material, a fireproof material and a fire extinguishing material, and can be compounded with various materials and interfaces which do not corrode the wall materials of the microcapsule to prepare various cooling, fireproof and fire extinguishing products.

The first-layer shell and the second-layer shell respectively contain one or more polymer materials. The mass ratio of the dry weights of the perfluorohexanone to the capsule shell in perfluorohexanone microcapsules can be 5:1-9:1. In this ratio, the content of effective fire extinguishing components in perfluorohexanone microcapsules is high, so it has high fire extinguishing effect.

The perfluorohexanone microcapsules have a size with a diameter in the range of 20-400 μm (for example, 20-100 μm, 50-200 μm, 100-150 μm, 150-300 μm, 250-400 μm). The size distribution of microcapsules can be narrow, wide, or multi-modal. The selection of the most suitable size range and size distribution of microcapsules depends on the expected application. In this range, perfluorohexanone microcapsules can be used to prepare micro-to macro-scale fire extinguishing materials, such as fire extinguishing dry powder, fire extinguishing stickers, fire extinguishing coatings, etc., which are suitable for various environmental requirements and have a wide range of applications.

The polymer materials contained in the first-layer shell and the second-layer shell are independently selected from one or more of natural polymers, semi-synthetic polymers and synthetic polymers. Preferably, the polymer material has the following properties: the softening point before curing is 30-100° C. and the softening point after curing is 80-150° C.; the air permeability is less than 700 ml/(cm²·h), the shrinkage after curing is less than 5%, the water absorption is less than 5%, and the tensile strength is greater than 10 MPa and less than 80 MPa. The formed microcapsules can soften, rupture and release perfluorohexanone at 80-130° C. or when exposed to open flame, and automatically trigger the fire extinguishing function.

According to the above structure, the perfluorohexanone microcapsule of the present application shows high stability as a fire extinguishing material. The wall material of the microcapsule has high strength, can delay the evaporation loss of perfluorohexanone in the microcapsule, can keep the fire extinguishing performance without obvious attenuation in a wide temperature and humidity range, and has a long storage and service life. Therefore, the perfluorohexanone microcapsule can be used as a fire extinguishing material, and can be stably compounded with various materials and interfaces to prepare fire prevention and fire extinguishing products.

With regard to the physical properties of the above-mentioned polymer materials, the stability of the perfluorohexanone microcapsules of this example is not a single physical property, but these physical properties participate in each other in a complex way. Therefore, especially for the above-mentioned physical properties, even if one of them is within the above-mentioned range, if the other physical properties are outside the above-mentioned range, the stability of perfluorohexanone microcapsules will be reduced.

According to the test of softening point in GB/T 12007.6-1989, if the softening point before curing and the softening point after curing of the polymer material in this example are within the specified range, the fire extinguishing function can be automatically triggered at 80-130° C. or in case of open flame, so excellent fire extinguishing performance can be obtained. If the softening point before curing and cross-linking and the softening point after curing are less than the above range, the storage environment will be limited, and the leakage of perfluorohexanone will be released in the high-temperature storage environment, so it is not preferable from the economic point of view. On the other hand, if the softening point before curing and after curing is higher than the above range, it is not conducive to timely and effective fire extinguishing. Therefore, the polymer material in this example has a softening point of 30-100° C. before curing and a softening point of 80-150° C. after curing.

According to GB/T 7755.1-2018, the air permeability of the cured polymer material is related to the compactness of capsule shell. If the air permeability is greater than the above range, the compactness of capsule shell will decrease, which will easily lead to the gasification escape of perfluorohexanone microcapsules and decrease the storage stability.

According to the shrinkage test of HG/T 2625-1994, the shrinkage of the above polymer materials after curing is related to the dimensional stability of perfluorohexanone microcapsules. If the shrinkage ratio is greater than the above range, the structure and size of perfluorohexanone microcapsules are unstable in the preparation process, and the size of the prepared perfluorohexanone microcapsules is uncontrollable, and the stability is reduced, and the structure and/or size stability of the prepared products are reduced when the perfluorohexanone microcapsules are compounded with materials or interfaces.

According to GB/T 8810-1988, the water absorption of the above polymer materials after curing is related to the permeability of capsule shell. When the water absorption rate is greater than the above range, the permeability of capsule shell will increase, and it will be easily attacked by water-containing environment during handling and storage, which will lead to the leakage of perfluorohexanone and reduce its stability.

According to GB/T 30776-2014, the tensile strength of the cured polymer material is related to the mechanical stability of capsule shell. When the tensile strength is less than the above range, the capsule is easy to be damaged or destroyed, and the perfluorohexanone microcapsule flows out of capsule shell, which reduces the stability and reduces its application range in preparing fire prevention and/or fire extinguishing products. The tensile strength is greater than the above range, which is not conducive to the outflow of perfluorohexanone in the capsule and reduces the fire extinguishing effect.

In some embodiments, the capsule shell further comprises an anti-ultraviolet agent.

In some embodiments, the capsule shell further comprises a nano-oxide.

In some embodiments, the nano oxide comprises nano silicon dioxide or nano metal oxide.

In some embodiments, the nano oxide comprises nano silicon dioxide and nano metal oxide.

Preferably, the nano metal oxide has good dispersibility in water, and the nano metal oxide is selected from one or more of nano titanium dioxide, nano zinc oxide, nano aluminum oxide, nano magnesium oxide and nano calcium oxide. The nano-oxides provide needed benefits for perfluorohexanone microcapsules. For example, in the process of forming, extinguishing and storing fire extinguishing agent microcapsules, in addition to normal rupture due to high temperature response, the capsule shell may be damaged due to external factors such as temperature and humidity, oxidation, illumination and vibration, and perfluorohexanone will leak, and a small amount of water will enter the microcapsules during the preparation process, and then perfluorohexanone will be partially hydrolyzed, and hydrofluoric acid, one of the hydrolysis products, can corrode the microcapsule shell, leading to the result that the intact microcapsule structure is destroyed, and the contents are leaked due to the incomplete shell of the microcapsule, so that perfluorohexanone is slowly volatilized and the fire extinguishing effect of the microcapsule is reduced. Through a large number of experimental studies, the applicant found that adding nano-silica and nano-metal oxide into polymer solution in the process of preparing perfluorohexanone microcapsules can significantly improve the storage stability of perfluorohexanone microcapsules. It is well known to those skilled in the art that perfluorohexanone is easy to hydrolyze during firefighting, which forms hydrofluoric acid, which further erodes the wall materials, further leaks perfluorohexanone, and reduces its service life. Nano-metal oxides can absorb the hydrolysis products of firefighting materials and react with hydrofluoric acid to form fluoride which is difficult to ionize, thus reducing the residue of hydrofluoric acid, avoiding its erosion on the wall materials of microcapsules, maintaining the inherent form of unbroken microcapsules, significantly improving the storage stability of microcapsules, and greatly prolonging the service life and firefighting times of finished products.

In some embodiments, examples of natural polymers include, but are not limited to, gelatin, alginate, gum Arabic, chitosan, polyglutamic acid, ⊖-cyclodextrin, or combinations thereof. Examples of semi-synthetic polymers include, but are not limited to, sodium carboxymethyl cellulose, hydroxypropyl methylcellulose, starch octenylsuccinate or combinations thereof. Examples of synthetic polymers include, but are not limited to, polymethacrylate, epoxy resin, polyurethane, amino resin, phenolic resin, acrylic resin, furan resin, resorcinol-formaldehyde resin, xylene-formaldehyde resin, unsaturated polyester, polyimide, urea-formaldehyde resin or combinations thereof.

In some embodiments, the polymer material contained in the first-layer shell is a water-soluble polymer, and in the mixed system with the water-insoluble or insoluble core material, another component is added, or some conditions, such as temperature, are changed, so that phase separation occurs, thereby coating around the core material to form capsules. Preferably, the polymer material is selected from one or more of gelatin, alginate, Arabic gum, chitosan, polyglutamic acid, carboxymethyl cellulose, hydroxypropyl methylcellulose, beta-cyclodextrin and starch octenylsuccinate.

In some embodiments, the polymer material contained in the second-layer shell has film forming property, and the preferred polymer material is selected from one or more of gelatin, sodium alginate, sodium carboxymethyl cellulose, hydroxypropyl methylcellulose, chitosan, Arabic gum, polyglutamic acid, ⊖-cyclodextrin, starch octenylsuccinate, polymethylmethacrylate, epoxy resin, polyurethane, amino resin, phenolic resin, acrylic resin, furan resin, resorcinol-formaldehyde resin, xylene-formaldehyde resin, unsaturated polyester, polyimide, and urea-formaldehyde resin.

Preferably, the first-layer shell and the second-layer shell contain different polymer materials.

[First-Layer Shell]

In some embodiments, the first-layer shell includes gelatin.

In some embodiments, the first-layer shell includes polyacrylate, such as polymethacrylate or polymethacrylate.

In some embodiments, the first-layer shell comprises an anti-ultraviolet agent. Preferably, the anti-ultraviolet agent is selected from one or more of salicylates, benzophenone and benzotriazole.

In some embodiments, the first-layer shell further comprises nano-oxide.

In some embodiments, the nano oxide comprises nano silicon dioxide or nano metal oxide.

In some embodiments, the nano oxide comprises nano silicon dioxide and nano metal oxide.

Preferably, the nano metal oxide has good dispersibility in water and is selected from one or more of titanium dioxide, zinc oxide, aluminum oxide, magnesium oxide and calcium oxide. Preferably, the nano metal oxide is nano zinc oxide and/or nano titanium dioxide.

A single-layer shell microcapsule can be formed by emulsifying a liquid core material into a droplet and forming a first-layer shell around the droplet. Microencapsulation (microencapsulation) of liquid core materials can be carried out by various methods known in the art, including coagulation, in-situ polymerization and interfacial polymerization. Such techniques are known in the art.

In some embodiments, microcapsules are prepared by a coagulation method including oil-in-water emulsification and subsequent curing of a curing agent or crosslinking agent. Such a process is known in the art and includes the use of an aqueous phase containing a wall material capable of forming a capsule core, a curing agent or a crosslinking agent for curing the wall material. The non-aqueous phase and the aqueous phase are emulsified to form an oil-in-water emulsion containing non-aqueous droplets dispersed in a continuous aqueous phase, and then a curing agent or a cross-linking agent is added to cure and cross-link the polymer material around the perfluorohexanone, thereby encapsulating the perfluorohexanone.

Therefore, single-layer shell microcapsules can be prepared by providing a non-aqueous phase of perfluorohexanone capable of forming a capsule core; providing an aqueous phase capable of forming a wall material of a condensed layer; emulsifying the non-aqueous phase and the aqueous phase to form an emulsion containing a non-aqueous liquid dispersed in the aqueous phase; and curing the wall material so that the wall material precipitates around the droplet containing the capsule core, thereby encapsulating perfluorohexanone.

In some embodiments, the aqueous phase comprises an anti-ultraviolet agent. Preferably, the anti-ultraviolet agent is selected from one or more of salicylates, benzophenone and benzotriazole. Preferably, the anti-ultraviolet agent is phenyl salicylate and/or octyl salicylate. More preferably, the addition amount of the anti-ultraviolet agent is 0.05-0.2% of the mass of the polymer material.

In some embodiments, the aqueous phase further comprises a nano-oxide.

In some embodiments, the nano oxide comprises nano silicon dioxide or nano metal oxide.

In some embodiments, the nano oxide comprises nano silicon dioxide and nano metal oxide.

Preferably, the nano metal oxide has good dispersibility in water, and the nano metal oxide is selected from one or more of nano titanium dioxide, nano zinc oxide, nano aluminum oxide, nano magnesium oxide and nano calcium oxide. Preferably, the nano metal oxide is nano zinc oxide and/or nano titanium dioxide.

In some embodiments, the nano oxide is nano silicon dioxide, nano titanium dioxide and nano zinc oxide.

In some embodiments, the added amount of the nano-oxide is 0.05%-0.2% of the dry mass of the wall material. The mass ratio of the added nano-silica to the added nano-metal oxide is 1: (2.5-5).

In some embodiments, the temperature of the above emulsification process is 0-40° C. and the stirring speed is 300-3000 rpm/min.

In some embodiments, the single-layer shell capsules are prepared by a single coagulation method, and the wall material is selected from one of gelatin, alginate, Arabic gum, chitosan, polyglutamic acid, carboxymethyl cellulose, sodium carboxymethyl guar gum, ⊖-cyclodextrin and starch octenylsuccinate.

In some embodiments, the above-mentioned single-layer shell capsules are prepared by a complex coacervation method, and the wall material comprises one or more of gelatin, a polymer with opposite charge compared with gelatin. Preferably, the polymer is selected from one or more of gum Arabic, chitosan, alginate and sodium carboxymethyl cellulose.

In some embodiments, the typical method for forming the first-layer shell when the wall material is a single kind is the single coagulation method, and the specific preparation method comprises the following steps: preparing a wall material aqueous solution with a mass concentration of 5%-30%, adding an anti-ultraviolet agent and nano-oxide, and uniformly mixing; adding perfluorohexanone into the wall material solution, stirring and emulsifying to form microcapsule emulsion, wherein perfluorohexanone is wrapped in the shell of the microcapsule; adding a curing agent to cure the wall material of the microcapsule, and then washing and separating to obtain the perfluorohexanone microcapsule with a single shell. The addition amount of perfluorohexanone is 1-9 times, preferably 5-9 times, of the dry mass of the wall material.

In some embodiments, the curing agent is selected from one or more of formaldehyde, acetaldehyde, glutaraldehyde and glyoxal. Preferably, the curing agent is formaldehyde and/or glutaraldehyde, and the adding amount of the curing agent is 0.1%-10% of the dry mass of the wall material.

In some embodiments, the first-layer shell is formed by an interfacial polymerization process. For example, the first-layer shell can be prepared by an interfacial polymerization process, which includes: using a non-aqueous phase containing perfluorohexanone and one or more oil-soluble monomers, and an aqueous phase containing one or more water-soluble monomers and an emulsifier; emulsifying the non-aqueous phase and the aqueous phase to form an emulsion containing non-aqueous droplets dispersed in the aqueous phase; after that, usually polymerizing the monomer by heating, wherein the polymerization is carried out at the interface between the non-aqueous phase and the aqueous phase.

In some embodiments, the first-layer shell is prepared by an in-situ polymerization process. Such processes are known in the art and generally include: preparing an emulsion containing droplets of a liquid core material dispersed in a continuous phase containing a precursor material that can be polymerized to form a polymer shell; and polymerizing the precursor material to form a polymer shell, thereby encapsulating the droplets.

In each of the emulsification processes described herein, emulsification can be performed using any suitable mixing device known in the art. For example, a homogenizer, a colloid mill, an ultrasonic dispersion device, or an ultrasonic emulsifier can be used. Preferably, a homogenizer is used.

The size of microcapsules can be controlled by changing certain factors, such as the stirring speed and shape of stirring blades or rotor blades of a stirrer or a homogeneous mixer used during the emulsification step of the microencapsulation process, or by adjusting the reaction rate by changing polymerization conditions for polymer materials, such as reaction temperature and time. In particular, the size of microcapsules can be controlled by adjusting the stirring speed and then adjusting the size of droplets of liquid core material in emulsion.

The mass ratio of core to capsule shell in microcapsules is controlled by changing some factors, such as the mass ratio of perfluorohexanone to polymer materials.

[Second-Layer Shell]

In some embodiments, the second-layer shell and the first-layer shell contain different polymer materials.

In some embodiments, the polymer material contained in the second-layer shell is selected from one or more of gelatin, alginate, Arabic gum, chitosan, polyglutamic acid, sodium carboxymethyl cellulose, beta-cyclodextrin and starch octenyl succinate.

Preferably, the preparation method of the second-layer shell comprises: dispersing perfluorohexanone microcapsules with a single-layer shell in a polymer material solution, stirring for more than 60 min, and selecting whether to add a curing agent or a precipitating agent to promote film formation according to the film-forming ability of the polymer material itself, filtering and washing to obtain perfluorohexanone microcapsules.

In some embodiments, the polymer material contained in the second-layer shell is selected from one or more of epoxy resin, polyurethane, amino resin, phenolic resin, acrylic resin, furan resin, resorcinol-formaldehyde resin, xylene-formaldehyde resin, unsaturated polyester, polyimide and urea-formaldehyde resin.

In some embodiments, the preparation method of the second-layer shell comprises: preparing an emulsion containing preliminary perfluorohexanone microcapsules dispersed in a continuous phase containing a precursor material that can be polymerized to form a polymer shell; and polymerizing the precursor material to form a second-layer shell, thereby obtaining perfluorohexanone microcapsules; dispersing perfluorohexanone microcapsules with a single shell into a solution containing precursor materials that can be polymerized to form a second-layer shell, and stirring for more than 60 min, filtering and washing to obtain perfluorohexanone microcapsules.

[Optional Third Layer Shell]

In some embodiments, the second-layer shell of the perfluorohexanone microcapsule is also coated with a third-layer shell. Preferably, the material of the third layer shell contains polysaccharide.

Polysaccharide polymers are well known to those skilled in the art. Preferred nonionic polysaccharides are selected from locust bean gum, xyloglucan, guar gum, hydroxypropyl guar gum, hydroxypropyl cellulose and hydroxypropyl methylcellulose, pectin and mixtures thereof.

[Microencapsulation Delivery System]

The microcapsules of the present application can be formulated into capsule delivery systems (e.g., microcapsule compositions) for use in products.

1. Slurry. The microcapsule delivery system can be compounded with a polymer solution to form a slurry containing microcapsules at a level of 10% to 80% (preferably 1% to 65% and more preferably 5% to 55%) of the weight of the microcapsule delivery system.
2. Powder. The microcapsules can be dried, for example, at low temperature. Drying microcapsules at low temperature can supply microcapsules in the form of powder, and perfluorohexanone microcapsule powder can be dispersed in water or polar solvents, such as alcohol such as ethanol, and can be stored in water and ethanol for more than two months with high stability.

[Application]

The microcapsule and delivery system of the present application are well suitable for but not limited to the following applications: for preparing fire prevention and/or fire extinguishing products, for preparing fire prevention and/or fire extinguishing related products, and for fire prevention, especially for all kinds of batteries, electrical boxes, high-speed rail, aerospace, electrical device, firefighting and other scenes that need fire prevention treatment in life.

[Product]

A fireproof and/or extinguishing material comprises perfluorohexanone microcapsule or perfluorohexanone microcapsule powder; and at least one matrix.

In some embodiments, the present application relates to a matrix material containing the above microcapsules or microcapsule powder, and a method for incorporating these microcapsules or microcapsule powder into the matrix material. In some embodiments, the present application relates to coatings and other articles of manufacture containing microcapsule powder of the above embodiments. Without wishing to be bound by theory, the matrix material such as the polymer containing the microcapsules or microcapsule powder can be highly fire-resistant, flame retardant and fire extinguishing, and the chemical structure of the coated polymer can be basically unchanged, so that the properties of the matrix material remain unchanged. Matrix materials can be used to create coatings for substrates. The matrix material can be used to create products with independent shapes, and to prepare fire prevention and/or fire extinguishing products with shapes suitable for various surfaces.

The matrix material may be any material in which the microcapsules or microcapsule powder of the above embodiments can be added, such as polymers and water-based coatings. The matrix of various embodiments may be, for example, metal, wood, fabric, concrete, particle board, polymer material, or combinations thereof. In some embodiments, the polymer matrix material of the polymer matrix can be polyolefin, polyurea, polyurethane, polyester, polyamide or a combination thereof. The article of manufacture containing the microcapsules of the present application incorporated into the matrix material or as the matrix material of the coating matrix can be any article of manufacture, and in some embodiments, can be an article of manufacture that is exposed to heat and/or may easily catch fire. Exemplary articles of manufacture include, but are not limited to, floor surfaces, textiles, fabrics, floor coverings, pillows, stretcher mats, seat covers, adhesive tapes, clothing, wiping cloths, furniture, conveyors, delivery trucks, delivery vans, tools, packages, containers, machine housings, machine covers, electronic components, electronic component carriers, wafer boards, wafer cans, batteries, antennas, transistors, printer assembly, fuel pump, fuel pump handle, hose, hose cover, fuel pump handle, fuel pump nozzles, fuel pipe fittings, automobile seat decoration, exterior panel, interior panels, vehicle console assemblies, gaskets, seals, O-rings, diaphragms, gears, valves, bushings, shock absorbers, grommets, stoppers, bellows, plugs, shock mounts, steering gears, weatherstrips, rollers, pipe connectors, computer cases, circuit boards, through-hole plating layers of circuit board, microprocessors, random access memory components, a read-only memory components, a disk drives, electrodes or photoresists.

When heated to a certain temperature or exposed to an open flame, the microcapsules or microcapsule powder incorporated into the matrix material burst, releasing perfluorohexanone, quickly absorbing heat and isolating air, reducing the temperature below the flame point temperature to realize automatic fire extinguishing, reducing the damage to the matrix material, and achieving the purpose of fire prevention or fire extinguishing. For example, a product made of polymer with incorporated microcapsules or microcapsule powder can be fireproof, fire-resistant and/or fire extinguishing. When heated to a certain temperature or exposed to an open flame, it will cause the microcapsules or microcapsule powder to burst, release perfluorohexanone, quickly absorb heat and isolate the air, so as to lower the temperature below the flame point temperature and extinguish any fire in the environment near the microcapsules or microcapsule powder and on the matrix material. Perfluorohexanone vaporizes quickly after fire extinguishing, which is non-conductive and does not pollute the protected object, and will not cause damage to finance, archives and precision facilities, and can greatly reduce the loss after fire. For example, due to the bursting of the microcapsule powder in the polymer, the damage to the cloth coated with the polymer containing the microcapsule powder will be reduced, thereby extinguishing the fire and preventing the flame from attacking the cloth substrate, thereby reducing the structural damage.

Exemplary products that include the capsules of the present application include, but are not limited to, fire extinguishing sheets and fire extinguishing cloths.

The present application relates to a fire extinguishing sheet, which comprises:
　　perfluorohexanone microcapsule powder and a matrix material.

In some embodiments, the surface of the fire extinguishing layer of the fire extinguishing sheet is also coated with a protective film. The stability of fire extinguishing materials can be further improved by coating the surface with protective film. The protective film can be formed by coating polymer on the surface of the fire extinguishing layer. A specific polymer film is sprayed on the surface of the fire extinguishing layer to form a protective film coated on the surface of the fire extinguishing microcapsule layer, which can block air, moisture, prevent aging, prevent acid and alkali fog, resist ultraviolet rays, maintain proper humidity, and at the same time have a self-repairing function under certain conditions. Polymer includes but is not limited to polyester, polyurethane, phenolic resin, urea-formaldehyde resin, polyurea resin, polymer silicon, natural polymer, acrylic resin, epoxy resin or a combination thereof. Preferably, the thickness of the protective film is 50-200 μm.

In some embodiments, the matrix material comprises a polymer binder, preferably a melamine-formaldehyde resin.

In some embodiments, the preparation method of the fire extinguishing sheet includes: mixing perfluorohexanone microcapsule powder with matrix material, uniformly dispersing, introducing into a mold, curing, drying, and spraying polymer on the surface of the fire extinguishing layer to obtain the fire extinguishing sheet. The mass fraction of the perfluorohexanone microcapsule powder in the fire extinguishing sheet is 40%-80%, the fire extinguishing time of the fire extinguishing sticker is less than or equal to 20 s, the smoldering time is 0 s, the continuous burning time is 0 s, there is no melting drop, and the weight loss rate is less than or equal to 5% in an air drying oven at 60° C. for 8 h.

The present application relates to a fire-proof cloth, which comprises:
　　perfluorohexanone microcapsule powder, a matrix material and a matrix cloth, wherein the perfluorohexanone microcapsule powder is arranged in a coating on the surface of the matrix cloth.

In some embodiments, the matrix cloth is a flame retardant cloth. Exemplary fire retardant fabrics include, but are not limited to, glass fiber fabrics, basalt fiber fire retardant fabrics, acrylic cotton fiber fire retardant fabrics, Nomex fire retardant fabrics, SM fire retardant fabrics, blue glass fiber fire retardant fabrics or aluminum foil fire retardant fabrics.

In some embodiments, the surface of the coating is also coated with a protective film. The surface of the coating is coated with protective film, which can further improve the stability of fire-fighting materials. The protective film can be formed by coating polymer on the surface of the coating. A specific polymer film is sprayed on the surface of the fire extinguishing layer to form a protective film coated on the surface of the fire extinguishing microcapsule layer, which can block air, moisture, prevent aging, prevent acid and alkali fog, resist ultraviolet rays, maintain proper humidity, and at the same time have a self-repairing function under certain conditions. The polymer is hydrophobic, film-forming, and has suitable softening point and glass transition temperature, including but not limited to polyester, polyurethane, phenolic resin, urea-formaldehyde resin, polyurea resin, polymer silicon, natural polymer, acrylic resin, epoxy resin or a combination thereof. Preferably, the thickness of the protective film is 50-200 μm. Preferably, the thickness of the coating is 0.5-3 mm.

In some embodiments, the above-mentioned matrix material is a specific polymer material, which is a preparation assistant for the semi-finished slurry of perfluorohexanone microcapsules. In order to stabilize and control hydrocolloids, hydrocolloids are usually used to improve the colloidal stability of the slurry for coagulation, deposition and emulsification. The term "hydrocolloid" refers to a wide range of water-soluble or water-dispersible polymers with anionic, cationic, amphoteric or nonionic characteristics. Preferably, the preparation adjuvant is polyester.

In some embodiments, the preparation method of the above-mentioned fire-proof and fire extinguishing cloth includes: mixing and uniformly dispersing perfluorohexanone microcapsule powder with preparation assistant solution to prepare a semi-finished slurry of perfluorohexanone microcapsule with coatability, forming a coating on the surface of the substrate by brushing and/or scraping, curing, drying, and spraying polymer on the surface of the coating to obtain the fire-proof and fire extinguishing cloth. The mass fraction of the perfluorohexanone microcapsule powder in the coating of the fire-proof and fire extinguishing cloth is 40%-80%, the fire extinguishing time of the fire-proof and fire extinguishing cloth is less than or equal to 20 s, the smoldering time is 0 s, the continuous burning time is 0 s, there is no melting drop, and the weight loss rate is less than or equal to 5% in an air drying oven at 60° C. for 8 hours.

The present application will now be further described by examples. It should be understood that the claimed present application is not intended to be limited by these examples in any way.

Example 1: Fire Extinguishing Sticker 100 g of a wall material solution was prepared, including 12.5 g of gelatin, 0.01 g of salicylate, 0.003 g of nano-silica powder and 0.01 g of nano-zinc oxide powder, and the solution was stirred at 60° C. until the components were dissolved and evenly dispersed.

90 g of perfluorohexanone was added to the wall material solution, and the mixture was stirred at 35° C. and 2000 rpm for 60 min. At this time, a microcapsule emulsion with gelatin as the wall material and perfluorohexanone embedded was formed.

2 ml of 20 wt % glutaraldehyde was added and stirred for 30 minutes. After the reaction, the microcapsules were separated by filtration and washed twice with deionized water to obtain 90 g of the preliminary product of microcapsules.

Figure 2:
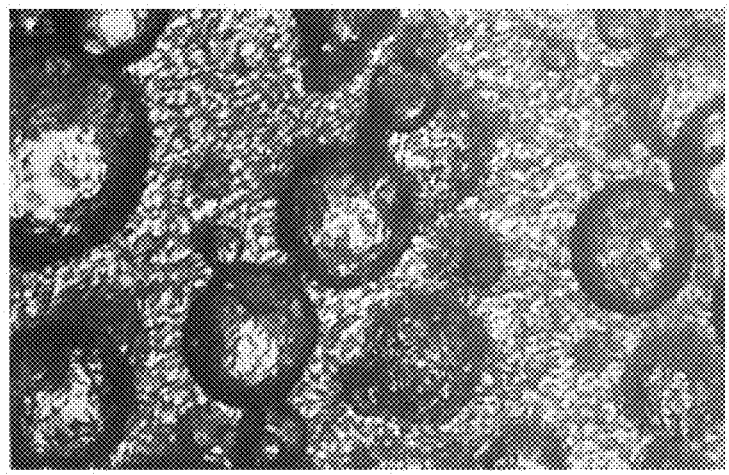
FIG. 2 is a microscopic image of perfluorohexanone microcapsules in the drying process in Example 1 of the present application.
Figure 3:
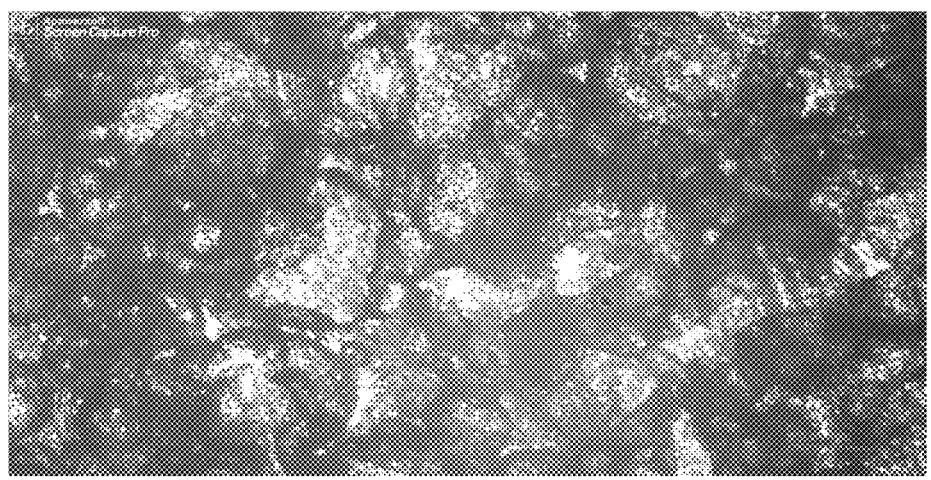
FIG. 3 is a microscopic image of perfluorohexanone microcapsules in Example 1 of the present application after being completely dried.

90 g of microcapsules were added into 100 g of a resorcinol-formaldehyde resin prepolymer solution, stirred and dispersed, stirred for 2 h, filtered and washed to obtain perfluorohexanone microcapsules; the perfluorohexanone microcapsules were dried at low temperature to obtain 85 g of microcapsule powder. The microscopic image of perfluorohexanone microcapsules is shown in FIG. 1, the microscopic image during drying is shown in FIG. 2, and the microscopic image after completely drying is shown in FIG. 3.

Figure 4:
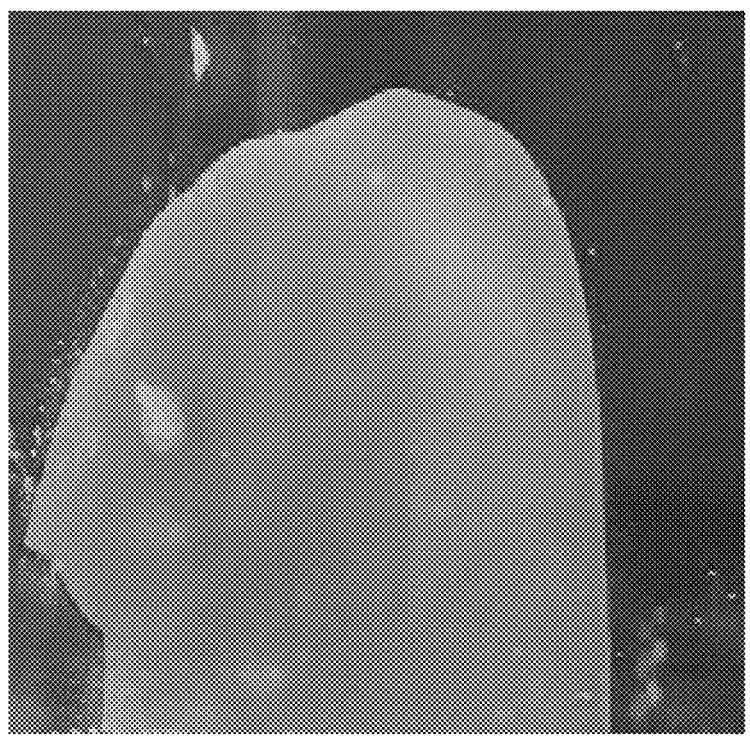
FIG. 4 is a perfluorohexanone microcapsule fire extinguishing paste in Example 1 of the present application.

The prepared 80 g microcapsule powder was added to 76 g water-soluble melamine-formaldehyde resin, stirred for 10 minutes, poured into a mold, and dried and molded at 40° C. to obtain the perfluorohexanone fire extinguishing tablet. A layer of polyurea of about 50 μm was scraped on the surface of the fire extinguishing sheet, and a layer of double-sided tape was coated on the back of the fire extinguishing sheet to prepare a perfluorohexanone microcapsule fire extinguishing sticker. See FIG. 4 for the fire extinguishing sticker of perfluorohexanone microcapsule.

Example 2: Fire Extinguishing Sticker 100 g of a wall material solution was prepared, including 10 g of gelatin, 0.01 g of salicylate, 0.005 g of nano-silica powder and 0.015 g of nano-zinc oxide powder, and the solution was stirred at 60° C. until the components were dissolved and evenly dispersed.

85 g of perfluorohexanone was added to the wall material solution, and the mixture was stirred at a speed of 2000 rpm at 35° C. for 60 min. At this time, a microcapsule emulsion with gelatin as the wall material and perfluorohexanone embedded was formed.

3 ml of 20 wt % glutaraldehyde was added and stirred for 30 minutes. After the reaction, the microcapsules were separated by filtration and washed twice with deionized water to obtain 85 g of the preliminary product of microcapsules.

85 g of microcapsules were added into 100 g of resorcinol-formaldehyde resin prepolymer solution, stirred and dispersed, stirred for 2 h, filtered and washed to obtain perfluorohexanone microcapsules, and the perfluorohexanone microcapsules were dried at low temperature to obtain 82 g of microcapsule powder.

80 g of microcapsule powder was added to 76 g of water-soluble melamine-formaldehyde resin, stirred for 10 min, poured into a mold, and dried and molded at 40° C. to obtain the perfluorohexanone fire extinguishing sheet. A layer of polyurea of about 50 μm was scraped on the surface of the fire extinguishing sheet, and a layer of double-sided tape was coated on the back of the fire extinguishing sheet to prepare a perfluorohexanone microcapsule fire extinguishing sticker.

Example 3

100 g of a wall material solution was prepared, including 15 g of gelatin, 0.02 g of salicylate, 0.008 g of nano-silica powder and 0.024 g of nano-zinc oxide powder, and the solution was stirred at 60° C. until the components were dissolved and evenly dispersed.

92 g of perfluorohexanone was added to the wall material solution, and it was stirred at 35° C. for 60 minutes at 2000 rpm. At this time, a microcapsule emulsion with gelatin as the wall material and perfluorohexanone embedded was formed.

3 ml of 20 wt % glutaraldehyde was added and stirred for 30 minutes. After the reaction, the microcapsules were separated by filtration and washed twice with deionized water to obtain 94 g of the preliminary product of microcapsules.

94 g of microcapsules were added into 105 g of resorcinol-formaldehyde resin prepolymer solution, stirred and dispersed, stirred for 2 hours, filtered and washed to obtain perfluorohexanone microcapsules, and dried at low temperature to obtain 90 g of microcapsule powder.

80 g of microcapsule powder was added to 76 g of water-soluble melamine-formaldehyde resin, stirred for 10 min, poured into a mold, and dried and molded at 40° C. to obtain the perfluorohexanone fire extinguishing sheet. A layer of polyurea of about 50 μm was scraped on the surface of the fire extinguishing sheet, and a layer of double-sided tape was coated on the back of the fire extinguishing sheet to prepare a perfluorohexanone microcapsule fire extinguishing sticker.

Example 4: Fire Extinguishing Cloth 100 g of a wall material solution was prepared, including 10 g of gelatin, 0.01 g of salicylate, 0.004 g of nano-silica powder and 0.012 g of nano-alumina powder, and the solution was stirred at 60° C. until the components were dissolved and dispersed.

50 g of perfluorohexanone was added, stirred at 25° C. for 40 minutes, then 2 ml of 10 wt % formaldehyde solution was slowly added, stirred for 30 minutes, separated and filtered to obtain 55 g of microcapsules.

55 g of microcapsules were added to 100 g of 1 wt % sodium carboxymethyl cellulose solution, stirred for 1 h, filtered, washed and dried at low temperature to obtain 54 g of microcapsule powder.

Figure 5:
FIG. 5 is a perfluorohexanone microcapsule fire extinguishing cloth in Example 4 of the present application.

54 g of the prepared microcapsule powder was added into 45 g of polyester solution and stirred for 10 minutes to obtain microcapsule slurry, which was coated on the flame retardant cloth by a doctor blade, and the thickness was controlled to be 1 mm by the doctor blade. After drying, a layer of 50 μm high molecular polyester self-repairing material was sprayed on the surface of the microcapsule coating, and the perfluorohexanone microcapsule fire extinguishing cloth with high stability was obtained after drying. See FIG. 5 for the fire extinguishing cloth of perfluorohexanone microcapsule, in which the white part in the upper right corner is the flame retardant base cloth.

Test Example 1: TG Representation

Figure 6:
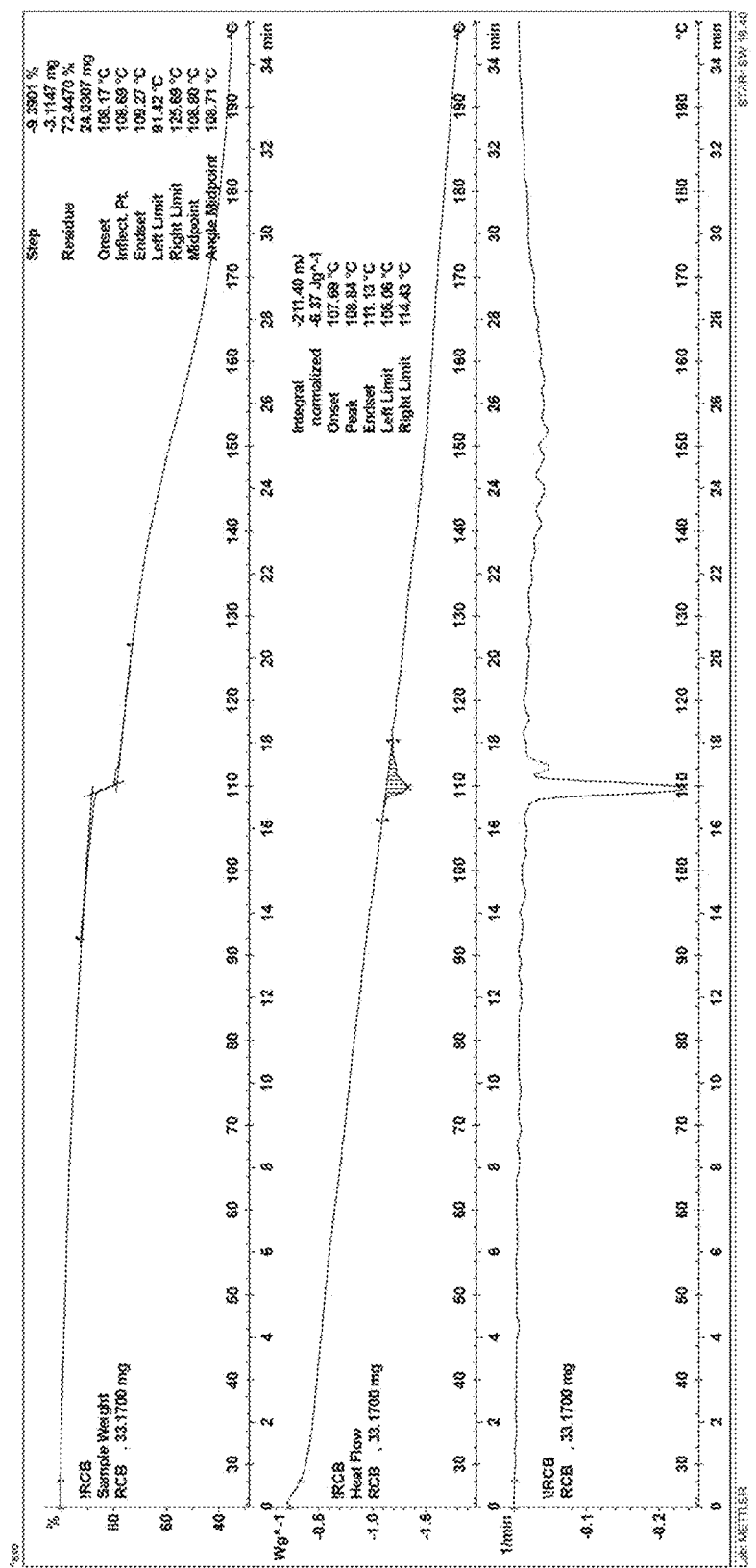
FIG. 6 is a thermogravimetric analysis curve of the fire extinguishing paste in Test example 1 of the present application.

Thermogravimetric analysis was used to test the thermal stability of the perfluorohexanone microcapsule fire extinguishing sticker prepared in Example 1. See FIG. 6 for the thermogravimetric analysis curve of the fire extinguishing sticker. As can be seen from FIG. 6, at 40-90° C., a small part of microcapsules were cracked by heat, and when the temperature reached 110° C., the walls of microcapsules began to crack obviously, and its fire extinguishing response temperature was about 110° C. It should be noted that the thermogravimetric analysis process is programmed temperature rise, during which all microcapsules will not break, so the weightless mass is not equal to the actual perfluorohexanone mass.

Test Example 2: Storage Stability Analysis

The storage stability of perfluorohexanone microcapsule fire extinguishing sticker is of great significance to the use of fire extinguishing sticker. In this experiment, the fire extinguishing sticker prepared in Example 1 was placed in an indoor environment (temperature 25° C.±2° C., relative humidity 60%±5%), and its storage stability was studied according to the change of the retention rate of perfluorohexanone microcapsule fire extinguishing sticker. The retention rate of fire extinguishing stickers was calculated according to the following formula:

$$\text{Retention rate (\%)} = \frac{\text{Weight of fire extinguishing stickers after retention for a period of time}}{\text{Initial weight of fire extinguishing stickers}}$$

Figure 7:
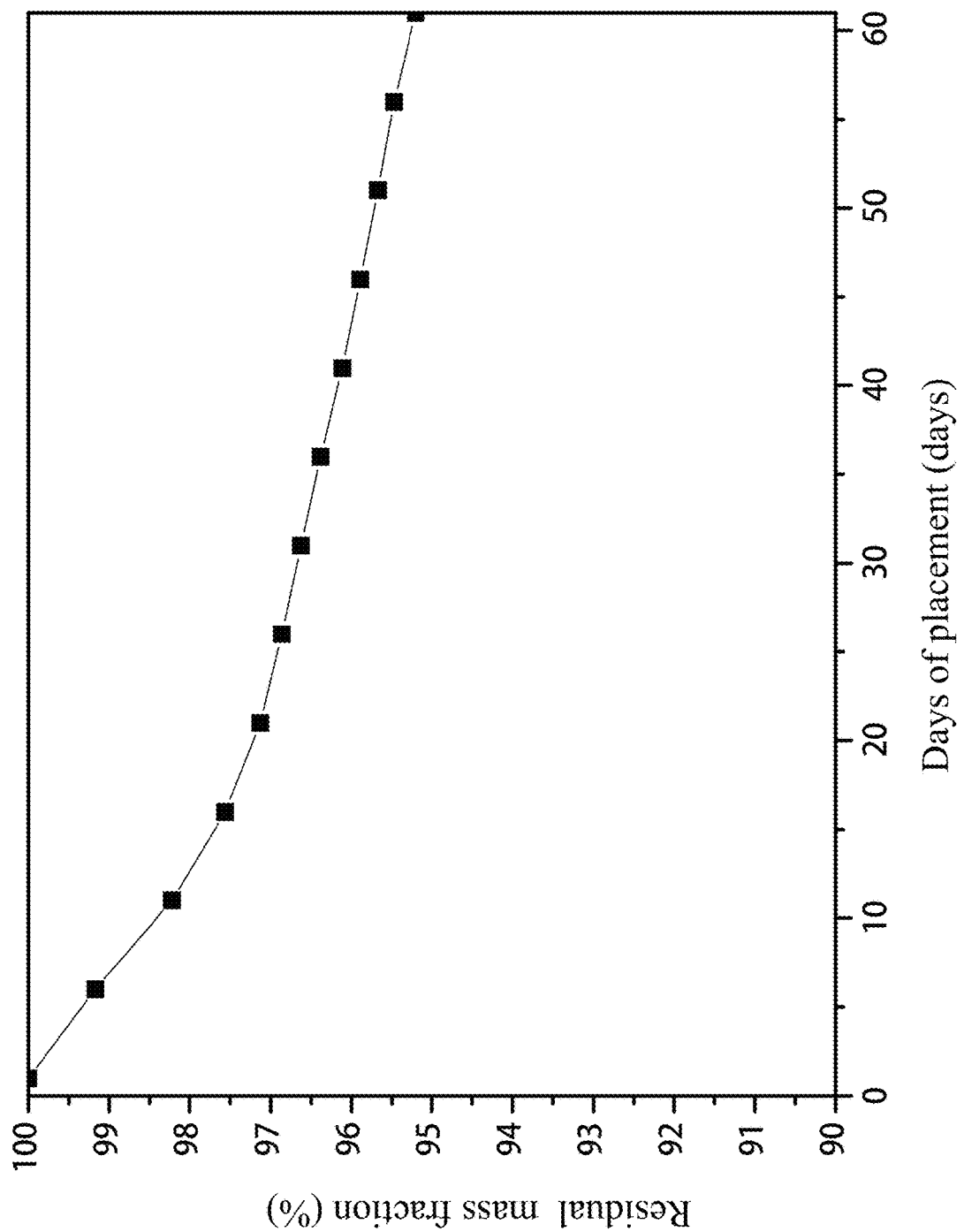
FIG. 7 shows the retention rate of the fire extinguishing sticker in Test example 2 of the present application during storage.

The retention rate of fire extinguishing stickers during storage is shown in FIG. 7. The quality changes in the early stage of the fire extinguishing sticker include the volatilization of a little residual water in the fire extinguishing sticker and the rupture of the microcapsules. With the loss of water, the weight loss will slow down in the later stage, especially after 20 days, indicating that the perfluorohexanone microcapsules exist stably in the fire extinguishing sticker. After standing in the indoor environment for 2 months, the residual dry weight is about 95%, showing good storage stability, indicating that the perfluorohexanone microcapsules do not rupture continuously with the extension of standing time, which is beneficial to the retention of perfluorohexanone in the microcapsules and the maintenance of fire extinguishing performance.

Test Example 3: Heat Resistance Analysis

Figure 8:
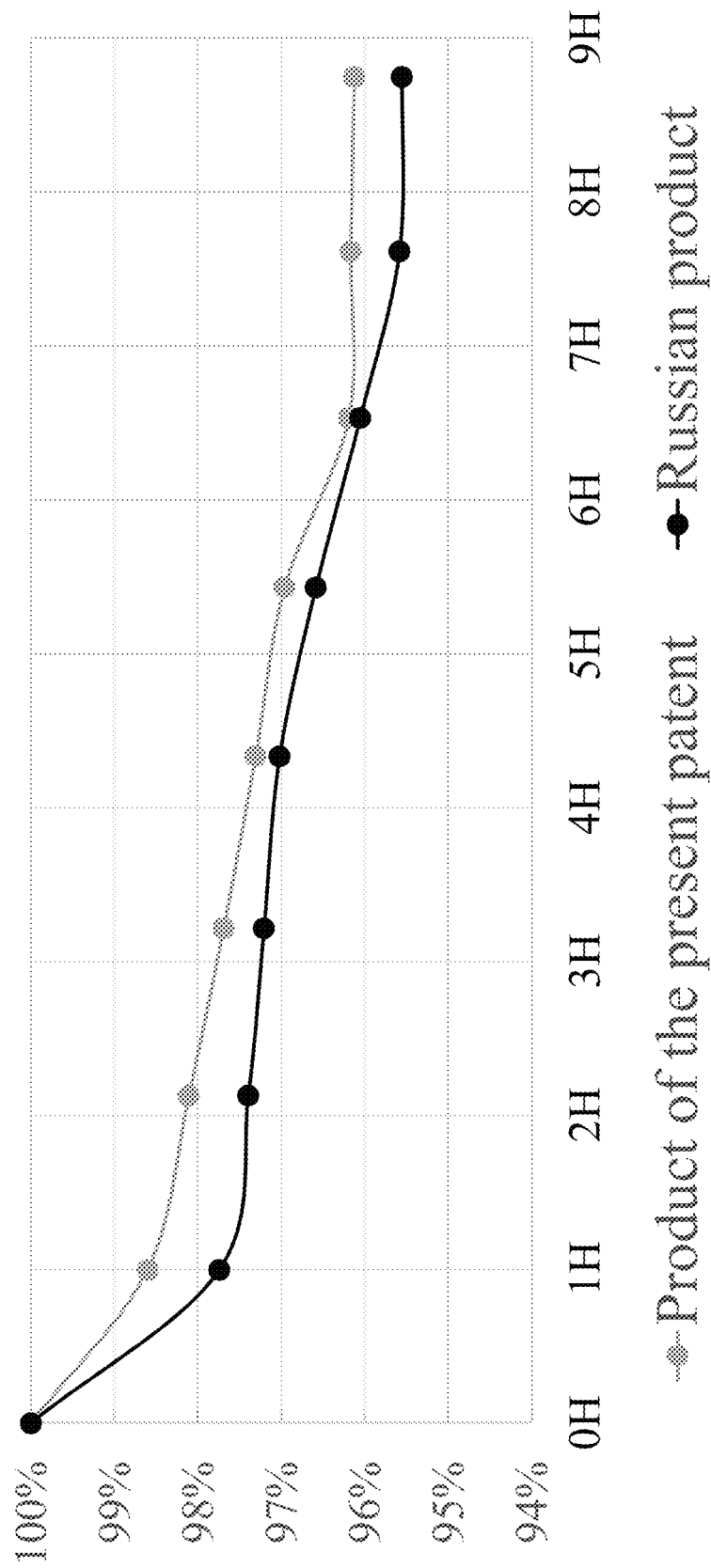
FIG. 8 shows the retention rate of fire extinguishing paste at 60° C. in Test example 3 of the present application.

The heat resistance of perfluorohexanone microcapsule fire extinguishing sticker has an important influence on its use in high temperature environment. Therefore, in this experiment, the fire extinguishing sticker prepared in Example 1 was placed in an oven at 60° C., and the heat resistance of perfluorohexanone microcapsules was analyzed according to the change of the retention rate of perfluorohexanone microcapsules, and the Russian PYCIN-TEX fire extinguishing sticker was selected for comparison. See FIG. 8 for the retention rate of fire extinguishing stickers at 60° C. As can be seen from FIG. 8, compared with similar fire extinguishing stickers made in Russia, the fire extinguishing stickers made in this embodiment have higher retention rate and higher thermal stability when baked at 60° C. for 8 hours.

Figure 9:
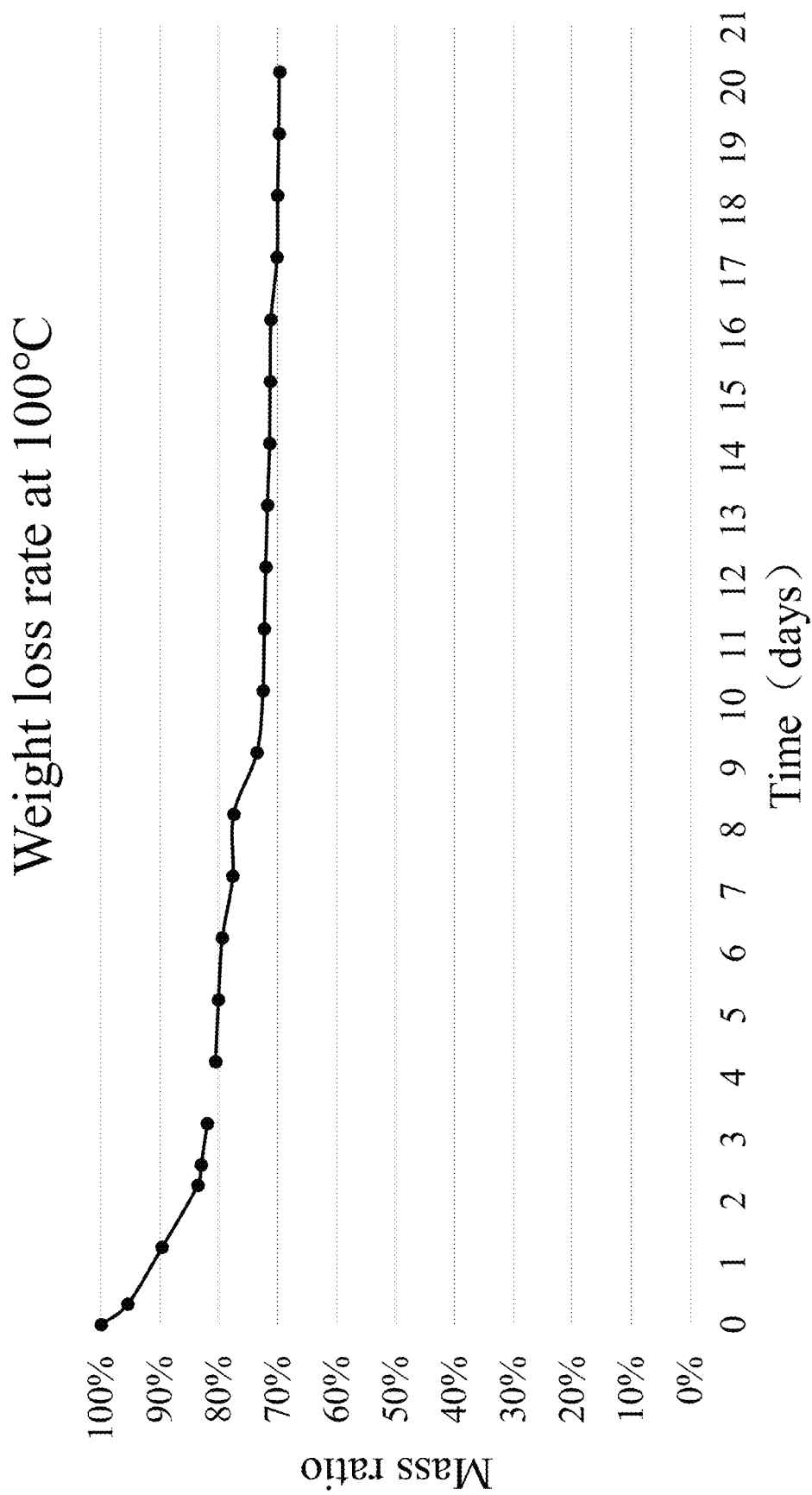
FIG. 9 shows the retention rate of the fire extinguishing paste at 100° C. in Test example 3 of the present application.

In order to further observe the heat resistance of perfluorohexanone microcapsule fire extinguishing sticker, the oven temperature was raised to 100° C. in this experiment, and the heat resistance of perfluorohexanone microcapsule was analyzed according to the change of the retention rate of perfluorohexanone microcapsule fire extinguishing sticker prepared in Example 1. The retention rate of the fire extinguishing sticker at 100° C. is shown in FIG. 9. As can be seen from FIG. 9, after 20 days of high temperature drying at 100° C., the weight loss rate of the fire extinguishing sticker in this experiment was about 30%. At the same time, the device 10 was used to carry out firefighting experiments. The initial fire extinguishing time was 2.7 s, and the infrared test temperature was within 40° C. during fire extinguishing. After being dried at 100° C. for 20 days, it still had fire extinguishing effect, the fire extinguishing time was 6 s, and the infrared test temperature during fire extinguishing was within 44° C.

Test Example 4: Fire Extinguishing Performance of Fire Extinguishing Stickers

A method for testing the fire prevention and/or fire extinguishing effect of fire prevention and/or fire extinguishing materials includes: taking a flame of about 800° C. as a fire source, measuring the temperature with an infrared thermometer, measuring the fire extinguishing time with a stopwatch, fixing the sheet on the surface of a stamped steel plate, placing the sheet face down at the outer flame of the flame 1.5 cm, measuring the fire extinguishing time and the temperature difference before and after fire extinguishing on the upper part of the sheet, and characterizing the fire prevention and/or fire extinguishing effect by the fire extinguishing time and the temperature difference.

Figure 10:
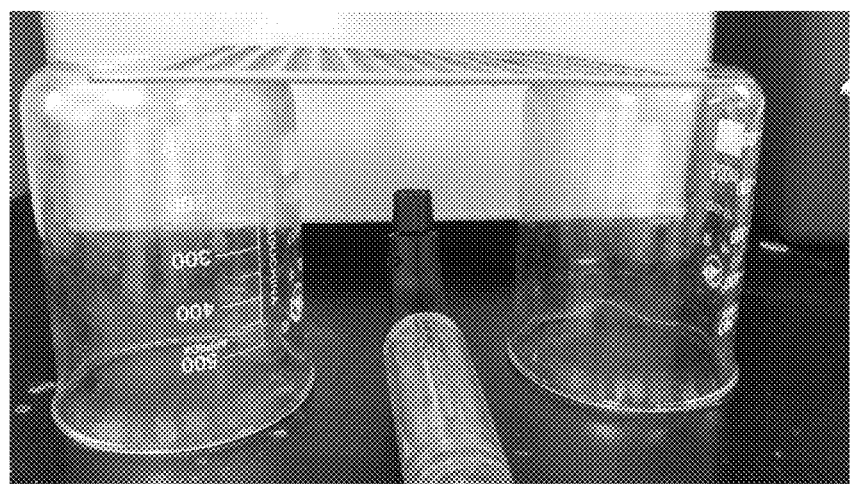
FIG. 10 is a device diagram for testing the fire extinguishing performance of fire extinguishing stickers in Test example 4 of the present application.

Based on the above method, a small-scale fire extinguishing experiment was carried out in the laboratory to verify the fire extinguishing performance of the fire extinguishing sticker. The test device is shown in FIG. 10. The test was performed with a Bosch infrared thermometer GIS 500. The instrument was 10 cm away from the sample, and the flame size and sample height were fixed. The sample was attached to the punched steel plate and placed downward at a position 1.5 cm away from the outer flame. The minimum flame was selected, and the flame temperature was about 800° C. Since the device can only measure the temperature within 500° C. and needs a certain distance from the sample, the temperature at 10 cm from the sample or flame was measured, and the display of high temperature section will be low. The fire extinguishing stickers in Example 1 and Example 2 were used as the samples, and the fire extinguishing stickers of PYCINTEX in Russia were selected for comparison. Multiple sites were selected for each sample, and repeated tests were conducted at the same location to observe the time required for fire extinguishing. The Russian sample could not put out the fire under this fire source. After 7 seconds of ignition, the fire sticker caught fire and the temperature rose to 130° C. The fire extinguishing stickers made in Example 1 and Example 2 were tested at 10 sites each, and the results are shown in Table 1.

TABLE 1

Fire Extinguishing Performance of Fire Extinguishing Stickers

| Fire extinguishing sticker | | Fire extinguishing time | Temperature variation range |
|---|---|---|---|
| Example 1 | Site 1 | 2.31 | Before ignition, the temperature was about 26° C., and the temperature gradually increased from ignition to the fire extinguishing stage, but it did not exceed 40° C. |
| | Site 2 | 2.33 | |
| | Site 3 | 1.28 | |
| | Site 4 | 2.9 | |
| | Site 5 | 1.76 | |
| | Site 6 | 2.66 | |
| | Site 7 | 1.63 | |
| | Site 8 | 1.93 | |
| | Site 9 | 2.35 | |
| | Site 10 | 0.57 | |
| Example 2 | Site 1 | 2.24 | Before ignition, the temperature was about 26° C., and the temperature gradually increased from ignition to the fire extinguishing stage, but it did not exceed 40° C. |
| | Site 2 | 2.19 | |
| | Site 3 | 2.41 | |
| | Site 4 | 1.90 | |
| | Site 5 | 2.08 | |
| | Site 6 | 1.16 | |
| | Site 7 | 1.84 | |
| | Site 8 | 1.85 | |
| | Site 9 | 2.16 | |
| | Site 10 | 0.77 | |

As can be seen from Table 1, the samples of fire extinguishing stickers prepared in Example 1 and Example 2 of this application can extinguish the fire within 3 s, and the temperature only slightly rises during the fire extinguishing process, and the highest temperature does not exceed 40° C., which indicates that the coating film can quickly extinguish the open flame, and the temperature at the fire extinguishing site only slightly rises, which has excellent active fire extinguishing performance and can better protect the articles to be coated with the coating film. Through comparative analysis, it can be seen that the Russian PYCINTEX fire extinguishing sticker cannot complete the active fire extinguishing, and the sample burns after 7 s, and the back temperature rises to 130° C., so it cannot play the role of fire prevention and fire extinguishing.

Example 5

The preparation method of the fire extinguishing sticker was basically the same as that of Example 3, except that the nano-silica powder was not added when the microcapsules were initially cured, and only 0.024 g of nano-zinc oxide powder was added, and the fire extinguishing sticker was obtained according to other parameters and steps the same as that of Example 3.

Example 6

The preparation method of the fire extinguishing sticker was basically the same as that of Example 3, except that the nano zinc oxide powder was not added when the microcapsules were initially cured, and only 0.008 g of nano silicon dioxide powder was added, and the fire extinguishing sticker was obtained according to other parameters and steps the same as that of Example 2.

Example 7

The preparation method of fire extinguishing sticker is basically the same as that of Example 3, except that the weight ratio of nano-silica powder and nano-zinc oxide powder was different from that of Example 3 when the microcapsules were initially cured. A series of coating films were obtained according to the weight ratio of nano-silica powder and nano-zinc oxide powder, and the weight ratios were 1:6, 1:4, 1:2.5, 1:1, 3:1, 6:1 and 9:1 respectively.

Example 8

The preparation method of the fire extinguishing sticker was basically the same as that of Example 3, except that nano zinc oxide powder and nano silicon dioxide powder were not added during the initial curing of microcapsules, and the fire extinguishing sticker was obtained according to other parameters and steps the same as that of Example 3.

Test Example 5

According to the method of Test Example 4, the fire extinguishing performance attenuation of the fire extinguishing stickers made in Example 3 and Examples 5-8 (respectively referred to as Sample 3, Sample 5, Sample 6, Sample Group 7 and Sample 8) after multiple fires was tested with a Bosch infrared thermometer GIS 500. The instrument was 10 cm away from the sample, and the flame size and sample height were fixed. The testing device was shown in FIG. 10, and the sample was attached to the punched steel plate and placed at a position 1.5 cm away from the outer flame and the minimum flame was selected, and the flame temperature was about 800° C. Fire extinguishing response time was tested respectively, and the results are shown in Table 2.

TABLE 2

| Fire extinguishing sticker | | Fire extinguishing time | | | | |
|---|---|---|---|---|---|---|
| | | First time | Second time | Third time | Fourth time | Fifth time |
| Sample 3 | Site 1 | 2.37 | 2.44 | 2.96 | 4.71 | 6.45 |
| (Site) | Site 2 | 2.21 | 2.29 | 2.82 | 4.47 | 6.36 |
| Sample 5 | Site 1 | 2.53 | 2.71 | 4.46 | 6.85 | / |
| (Site) | Site 2 | 2.14 | 2.95 | 4.91 | / | // |
| Sample 6 | Site 1 | 2.02 | 2.95 | 4.85 | 6.63 | / |
| (Site) | Site 2 | 2.48 | 3.11 | 5.32 | / | // |
| Sample 7 | 1:6 | 2.59 | 2.92 | 4.69 | 6.68 | / |

TABLE 2-continued

Fire extinguishing time

| Fire extinguishing sticker | | First time | Second time | Third time | Fourth time | Fifth time |
|---|---|---|---|---|---|---|
| (Mass ratio of nano-silica to nano-zinc oxide) | 1:4 | 2.41 | 2.46 | 2.88 | 4.62 | 6.27 |
| | 1:2.5 | 2.29 | 2.39 | 2.98 | 4.84 | 6.76 |
| | 1:1 | 2.01 | 3.43 | 5.78 | / | // |
| | 3:1 | 1.45 | 3.86 | 4.92 | 6.21 | / |
| | 6:1 | 1.88 | 4.20 | 6.07 | / | // |
| | 9:1 | 2.66 | 4.75 | 6.69 | / | // |
| Sample 8 (Site) | Site 1 | 2.63 | 3.46 | 5.67 | / | // |
| | Site 2 | 2.49 | 3.13 | 5.34 | / | // |

Note:
"/" means that the fire extinguishing was not completed within 7 s, and "//" means that the previous result was "/", so the test was not conducted this time.

As can be seen from Table 2, sample 8 failed to extinguish the flame for the fourth time, indicating that the fire extinguishing effect was reduced to some extent compared with samples 5 and 6, indicating that the addition of nano-oxide was beneficial to the repetition and long-term play of fire extinguishing effect; samples 5 and 6 were unable to extinguish the fire for the fourth time, indicating that the fire extinguishing effect was decreased to some extent compared with sample 3, indicating that the repetition and long-term performance of the fire extinguishing effect when nano-silica and nano-metal oxide were added alternatively were not as good as that when they were added simultaneously. Similarly, many samples in sample group 7 were also unable to extinguish the fire for the fourth time. Moreover, by comparing various samples in sample group 7 with the data in Example 3, it can be known that only when the weight ratio of nano-silica to nano-metal oxide is 1:2.5-5 can it play an excellent role in repeated fire extinguishing, and it has positive significance for its storage stability in the conventional application environment.

Test Example 6: The Fire Extinguishing Performance of the Fire Extinguishing Cloth Made in Example 4 was Analyzed According to the method of test example 4, the fire extinguishing performance of the fire extinguishing cloth made in Example 4 was tested, and a small-scale fire extinguishing experiment was carried out in the laboratory. The test device was shown in FIG. 10, and the instrument was tested with a Bosch infrared thermometer GIS 500. The instrument was 10 cm away from the sample to measure the temperature, and the flame size and sample height were fixed. The sample microcapsule layer was attached to the punched steel plate and placed at a position 1.5 cm away from the outer flame, and the minimum flame was selected, and the flame temperature was about 800° C. The fire-fighting cloth in Example 4 was used as the sample, and the base cloth of the fire-fighting cloth in Example 4, that is, the flame retardant cloth without microcapsule coating, was selected for comparison. The test was repeated at the same position to observe the time required for fire extinguishing. The flame retardant cloth cannot put out the fire actively, and the back temperature of the sample rises to 200° C. after 12 seconds, which cannot play a role in extinguishing the fire and cooling down. The fire cloth could extinguish the fire within 15 seconds, and the temperature during the period did not exceed 40° C.

The conventional techniques in the above embodiments are known to those skilled in the art, so they will not be described in detail here.

The above embodiments are only used to illustrate, rather than to limit the present application, and those skilled in the art can make various changes and modifications without departing from the spirit and scope of the present application. Therefore, all equivalent technical solutions also belong to the scope of the present application, and the patent protection scope of the present application should be defined by the claims.

What is claimed is:

1. A perfluorohexanone microcapsule with a fire extinguishing trigger temperature of 80-130° C., comprising:
   a capsule core containing perfluorohexanone,
   a capsule shell, at least comprising a first-layer shell and a second-layer shell from inside to outside, wherein the first-layer shell and the second-layer shell each comprises a polymer material, wherein:
   a mass ratio of the perfluorohexanone to a dry weight of capsule shell is in a range of 5:1 to 9:1;
   a diameter of the perfluorohexanone microcapsule is in a range of 20-400 μm;
   the capsule shell further comprises nano oxide;
   the nano oxide comprises nano silicon dioxide and nano metal oxide;
   a mass ratio of the nano silicon dioxide to the nano metal oxide is in a range of 1:2.5 to 1:5;
   an amount of the nano oxide is 0.05%-0.2% of a dry mass of the capsule shell;
   the polymer material is selected from natural polymers, semi-synthetic polymers and synthetic polymers.

2. The perfluorohexanone microcapsule according to claim 1, wherein a softening point of the polymer material after curing is 80-130° C.; an air permeability is less than 700 ml/(cm²·h), a shrinkage after curing is less than 5%, a water absorption is less than 5%, and the tensile strength is in a range of 10 MPa to 80 MPa.

3. The perfluorohexanone microcapsule according to claim 1, wherein:
   the natural polymers are selected from one or more of gelatin, alginate, chitosan and vegetable gum;
   the semi-synthetic polymers are selected from one or more of sodium carboxymethyl cellulose, hydroxypropyl methylcellulose, carboxymethyl cellulose, sodium carboxymethyl guar gum and starch octenylsuccinate;
   the synthetic polymers are selected from one or more of epoxy resin, polyurethane, amino resin, phenolic resin, acrylic resin, furan resin, resorcinol-formaldehyde resin, xylene-formaldehyde resin, unsaturated polyester, polyimide and urea-formaldehyde resin.

4. The perfluorohexanone microcapsule according to claim 1, wherein the capsule shell further comprises a third-layer shell outside the second-layer shell.

5. The perfluorohexanone microcapsule according to claim 1, wherein the capsule shell further comprises an anti-ultraviolet agent.

6. The perfluorohexanone microcapsule according to claim 1, wherein the nano oxide is in the first-layer shell.

7. The perfluorohexanone microcapsule according to claim 5, wherein the anti-ultraviolet agent is selected from one or more of salicylates, benzophenone and benzotriazole.

8. The perfluorohexanone microcapsule according to claim 1, wherein the nano metal oxide is selected from one or more of titanium dioxide, zinc oxide, aluminum oxide, magnesium oxide and calcium oxide.

9. The perfluorohexanone microcapsule according to claim 2, wherein the polymer material contained in the first-layer shell is selected from one or more of gelatin, sodium alginate, chitosan, polyglutamic acid, ß-cyclodextrin, sodium carboxymethyl cellulose, hydroxypropyl methylcellulose and starch octenylsuccinate.

10. The perfluorohexanone microcapsule according to claim 2, wherein the polymer material contained in the second-layer shell is selected from one or more of epoxy resin, polyurethane, amino resin, phenolic resin, acrylic resin, furan resin, resorcinol-formaldehyde resin, xylene-formaldehyde resin, unsaturated polyester, polyimide and urea-formaldehyde resin.

11. A perfluorohexanone microcapsule powder obtained by drying the perfluorohexanone microcapsule according to claim 1.

* * * * *